United States Patent
Miyajima

(10) Patent No.: US 11,216,230 B2
(45) Date of Patent: Jan. 4, 2022

(54) JOB TRANSMISSION DEVICE, JOB PROCESSING DEVICE, PROGRAM, AND JOB TRANSMISSION METHOD PERFORMED BY JOB TRANSMISSION DEVICE

(71) Applicant: SEIKO EPSON CORPORATION, Tokyo (JP)

(72) Inventor: Motomu Miyajima, Azumino (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 16/856,311

(22) Filed: Apr. 23, 2020

(65) Prior Publication Data
US 2020/0341710 A1 Oct. 29, 2020

(30) Foreign Application Priority Data
Apr. 26, 2019 (JP) .............................. JP2019-085269

(51) Int. Cl.
*G06F 3/12* (2006.01)
*H04N 1/00* (2006.01)
*G06K 15/02* (2006.01)

(52) U.S. Cl.
CPC .......... *G06F 3/1262* (2013.01); *G06F 3/1212* (2013.01); *G06F 3/1273* (2013.01)

(58) Field of Classification Search
None
See application file for complete search history.

(56) References Cited

U.S. PATENT DOCUMENTS

| | | | | |
|---|---|---|---|---|
| 5,861,958 A | * | 1/1999 | Jamrog | H04N 1/00206 358/403 |
| 6,813,038 B1 | * | 11/2004 | Kadowaki | G06F 3/1217 358/1.1 |
| 9,507,789 B2 | * | 11/2016 | Hashimoto | H04N 1/3208 |
| 2003/0076519 A1 | * | 4/2003 | Kadota | G06F 3/1225 358/1.11 |
| 2005/0162667 A1 | * | 7/2005 | Felix | H04N 1/00238 358/1.1 |
| 2006/0055952 A1 | * | 3/2006 | Ferlitsch | G06K 15/02 358/1.13 |
| 2006/0139690 A1 | * | 6/2006 | Yagita | G06F 3/1286 358/1.15 |
| 2007/0213870 A1 | * | 9/2007 | Roberts | G06F 3/1288 700/219 |
| 2009/0033979 A1 | * | 2/2009 | Morales | G06F 3/1206 358/1.15 |

(Continued)

FOREIGN PATENT DOCUMENTS

JP 2001-084122 A 3/2001

Primary Examiner — Beniyam Menberu
(74) Attorney, Agent, or Firm — Workman Nydegger

(57) ABSTRACT

A job transmission device includes a processing side storage unit that stores a job and a print server that transmits the job, and when a job subsequent to the job being transmitted is stored in the processing side storage unit, the print server aggregates the job subsequent to the job being transmitted to the job being transmitted and transmits the job subsequent to the job being transmitted as a single job aggregated to the job being transmitted. The print server may determine whether or not the job subsequent to the job being transmitted is stored in the processing side storage unit before transmitting a job end command included in the job being transmitted.

6 Claims, 17 Drawing Sheets

(56) References Cited

U.S. PATENT DOCUMENTS

| | | | |
|---|---|---|---|
| 2010/0079300 A1* | 4/2010 | Agata | G06F 11/0784 340/635 |
| 2010/0123917 A1* | 5/2010 | Minagawa | G06F 3/1285 358/1.9 |
| 2012/0212776 A1* | 8/2012 | Murata | G06F 3/1255 358/1.15 |
| 2013/0057884 A1* | 3/2013 | Sasaki | H04N 1/32523 358/1.9 |
| 2013/0107308 A1* | 5/2013 | Maeda | G06F 3/1285 358/1.14 |

* cited by examiner

| JOB START COMMAND | ~203 |

| PRINT DATA | ~205 |

| PRINT DATA | ~205 |

JOB TRANSMISSION DEVICE, JOB PROCESSING DEVICE, PROGRAM, AND JOB TRANSMISSION METHOD PERFORMED BY JOB TRANSMISSION DEVICE

The present application is based on, and claims priority from JP Application Serial Number 2019-085269, filed Apr. 26, 2019, the disclosure of which is hereby incorporated by reference herein in its entirety.

BACKGROUND

1. Technical Field

The present disclosure relates to a job transmission device, a job processing device, a program, and a job transmission method performed by the job transmission device.

2. Related Art

As disclosed in JP-A-2001-084122, a print job control method that aggregates a plurality of print jobs stored in a spooler and then transmits the aggregated print jobs to the printer device is known.

In the above print job control method, since a plurality of print jobs are aggregated before the print jobs are transmitted, printing is started only after the plurality of print jobs are stored in a spooler, which may delay the start of the printing.

SUMMARY

According to an aspect of the present disclosure, a job transmission device includes: a storage unit that stores a job; and a transmission unit that transmits the job, and when a job subsequent to the job being transmitted is stored in the storage unit, the transmission unit aggregates the job subsequent to the job being transmitted to the job being transmitted and transmits the job subsequent to the job being transmitted as a single job aggregated to the job being transmitted.

According to another aspect of the present disclosure, a job processing device includes: a storage unit that stores a job; a transmission unit that transmits the job; and a processing unit that receives the job transmitted from the transmission unit and processes the received job, and when a job subsequent to the job being transmitted is stored in the storage unit, the transmission unit aggregates the job subsequent to the job being transmitted to the job being transmitted and transmits next job subsequent to the job being transmitted as a single job aggregated to the job being transmitted.

According to another aspect of the present disclosure, a program causes a processor to aggregate a job to a job being transmitted and transmits the job subsequent to the job being transmitted as a single job aggregated to the job being transmitted when the job subsequent to the job being transmitted is stored in a storage unit.

According to another aspect of the present disclosure, a job transmission method performed by a job transmission device includes: aggregating a job subsequent to a job being transmitted to the job being transmitted and transmitting the job subsequent to the job being transmitted as a single job aggregated to the job being transmitted when the job subsequent to the job being transmitted is stored in a storage unit.

BRIEF DESCRIPTION OF THE DRAWINGS

FIG. 5B is a diagram illustrating a configuration of aggregated print jobs.

DESCRIPTION OF EXEMPLARY EMBODIMENTS

First Embodiment

Figure 1:
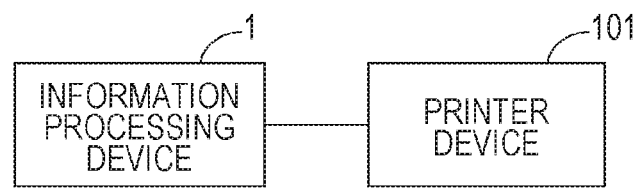
FIG. 1 is a block diagram illustrating a printer system of a first embodiment.

With reference to FIG. 1, a printer system Sa of a first embodiment will be described. The printer system Sa of the first embodiment includes an information processing device 1, which is one example of a job transmission device, and a printer device 101. The information processing device 1 and the printer device 101 are connected so as to communicate with each other in a wired or wireless manner. The information processing device 1 may be, for example, a personal computer, a smartphone, a tablet terminal, or the like. The information processing device 1 generates a print job 201 (see FIG. 5A) and transmits the generated print job 201 to the printer device 101. The printer device 101 receives the print job 201 transmitted from the information processing device 1 and performs a printing process, that is, a process of forming an image on a printing medium in accordance with the received print job 201.

Figure 2:
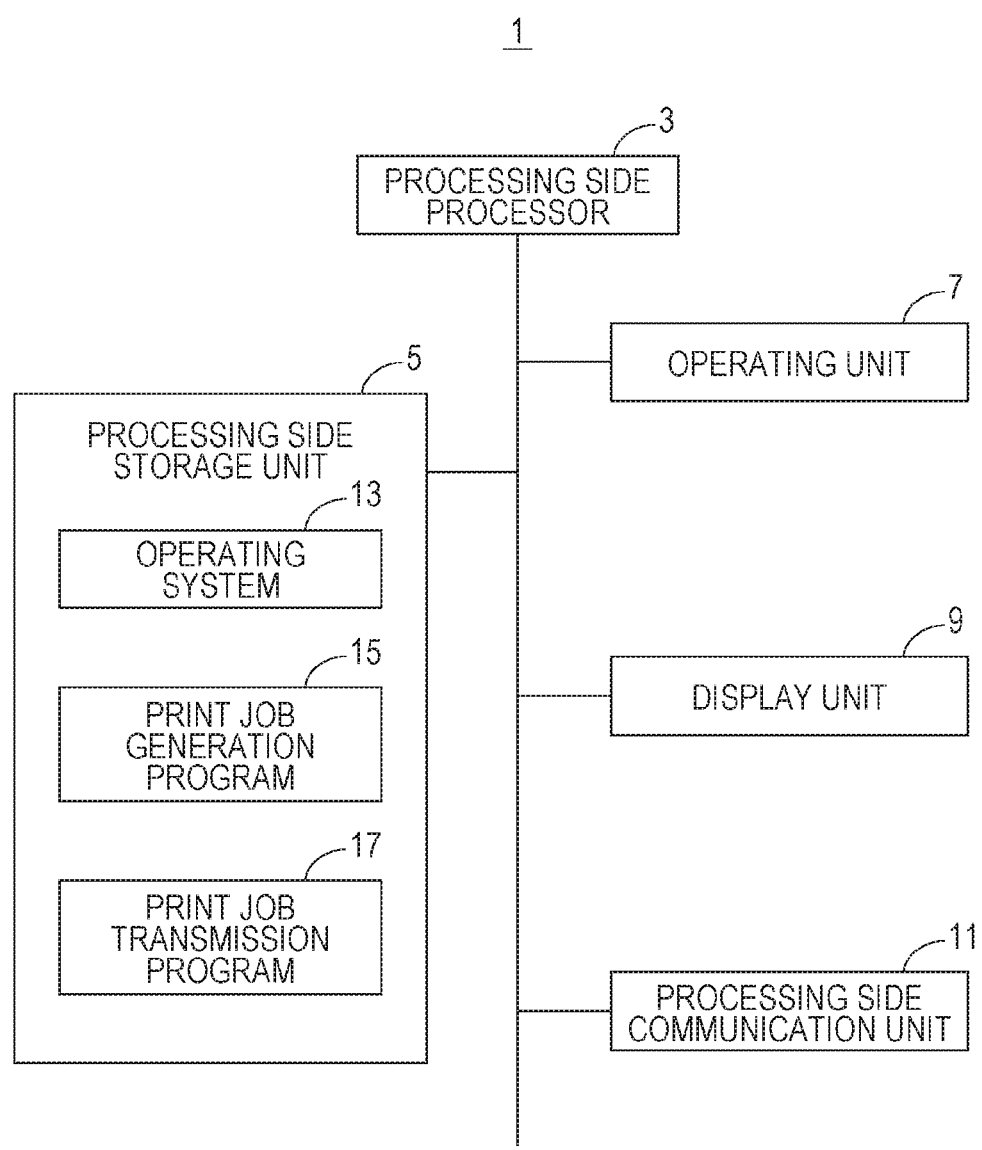
FIG. 2 is a block diagram illustrating a hardware configuration of an information processing device.

With reference to FIG. 2, the hardware configuration of the information processing device 1 will be described. The information processing device 1 includes a processing side processor 3, a processing side storage unit 5, an operating unit 7, a display unit 9, and a processing side communication unit 11.

The processing side processor 3 executes a program stored in the processing side storage unit 5. The processing side processor 3 may be, for example, one or a plurality of central processing units (CPUs), a digital signal processor (DSP), an application specific integrated circuit (ASIC), or the like or a combination thereof.

The processing side storage unit 5 stores a program and data. The program includes an operating system 13, a print job generation program 15, and a print job transmission program 17. The operating system 13 is the basic software of the information processing device 1. The print job generation program 15 is a program used for generating the print job 201 and may be, for example, a word processor application or a spreadsheet application. The print job transmission program 17 is a program used for transmitting the print job 201 to the printer device 101, as described later. The processing side storage unit 5 may include, for example, a random access memory (RAM), a read-only memory (ROM), a hard disc drive (HDD), flash memory, or the like.

The operating unit 7 accepts a user operation. The operating unit 7 may be, for example, a keyboard, a mouse, a touchpad, or the like.

The display unit 9 displays various information. The display unit 9 may be, for example, a liquid crystal display, an organic electro luminescence (EL) display, or the like.

The processing side communication unit 11 transmits and receives data and commands to and from the printer device 101.

Figure 3:
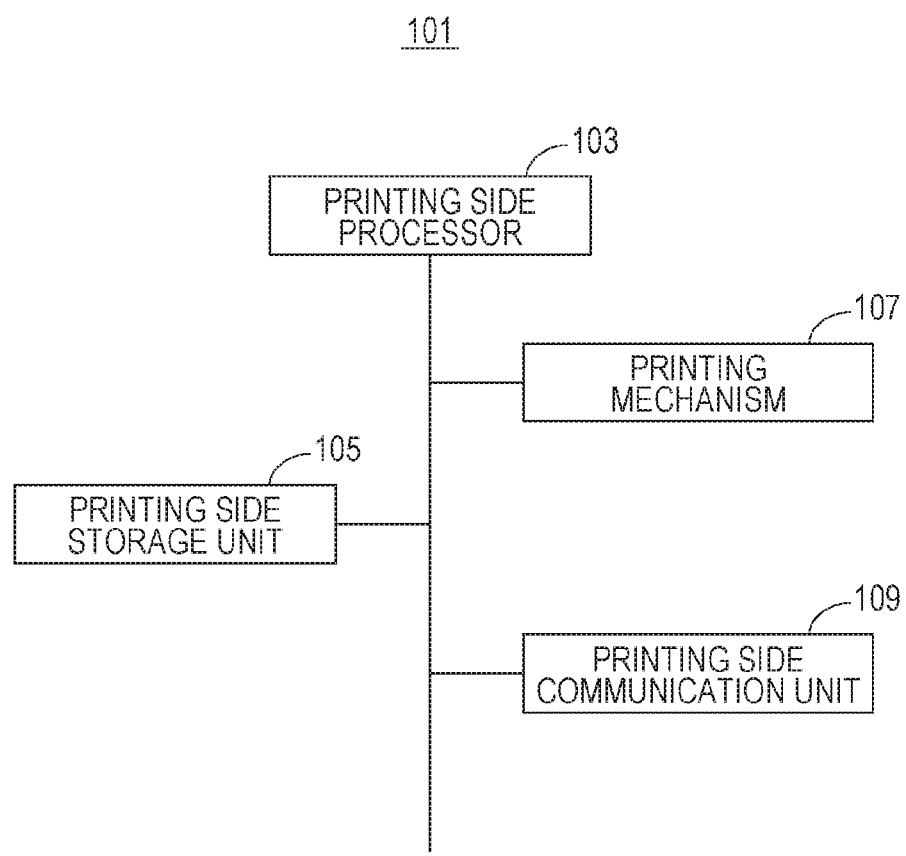
FIG. 3 is a block diagram illustrating a hardware configuration of a printer device.

With reference to FIG. 3, the hardware configuration of the printer device 101 will be described. The printer device 101 includes a printing side processor 103, a printing side storage unit 105, a printing mechanism 107, and a printing side communication unit 109.

The printing side processor 103 executes a program stored in the printing side storage unit 105. The printing side processor 103 may be, for example a CPU, a DSP, an ASIC, or the like.

The printing side storage unit 105 stores a program and data. The printing side storage unit 105 may include, for example, a RAM, a ROM, an HDD, flash memory, or the like.

The printing mechanism 107 performs a printing process in accordance with the print job 201 received from the information processing device 1 under the control of the printing side processor 103. The printing scheme of the printing mechanism 107 is not particularly limited and, for example, an ink jet scheme, an electrophotography scheme, a thermal scheme, or the like may be employed.

The printing side communication unit 109 transmits and receives data and commands to and from the information processing device 1.

Figure 4:
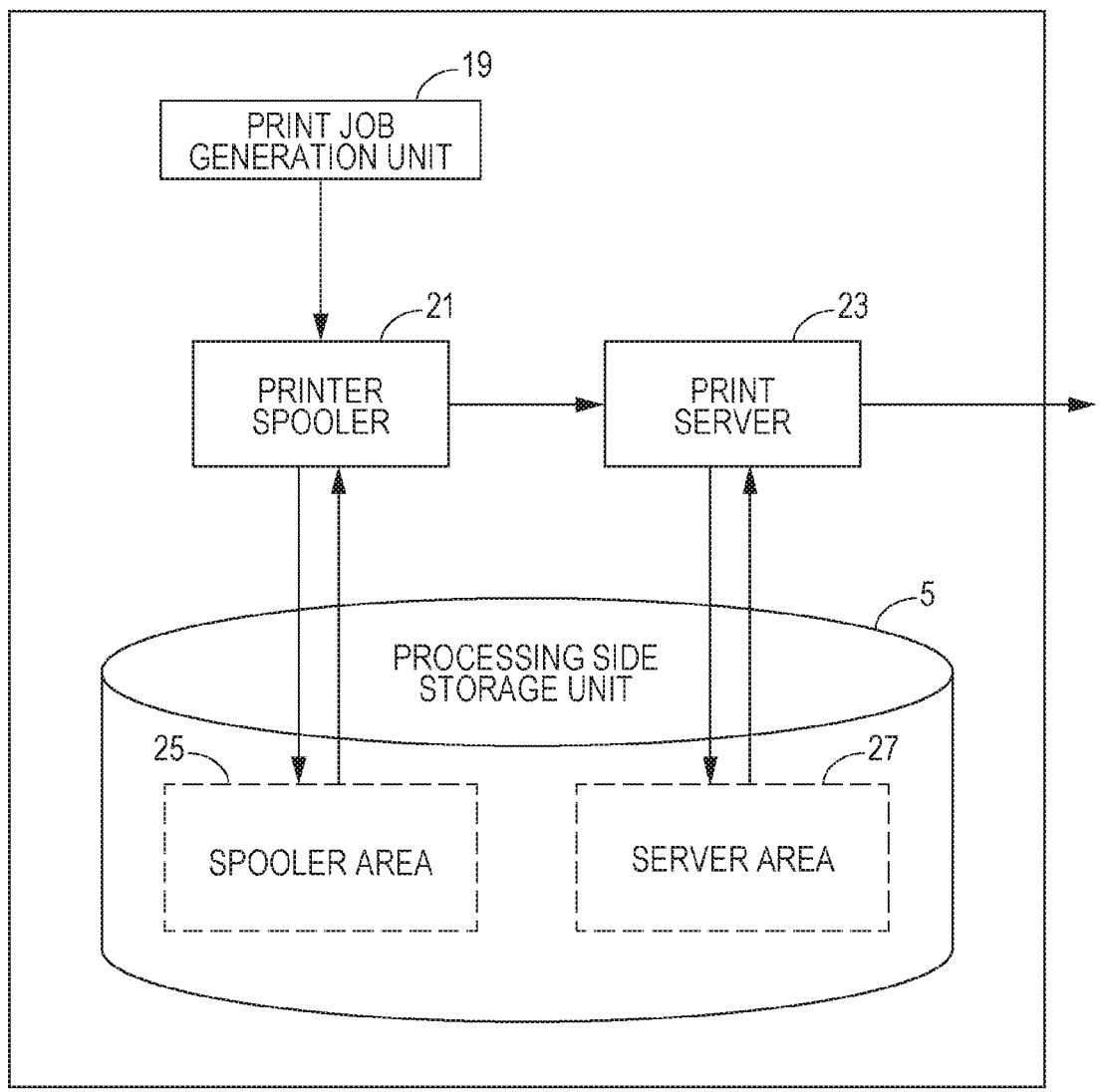
FIG. 4 is a block diagram illustrating a function configuration of the information processing device.

With reference to FIG. 4, the functional configuration of the information processing device 1 will be described. Note that each functional component of the information processing device 1 is implemented by the processing side processor 3 executing various programs stored on the HDD or the like of the processing side storage unit 5, as described later.

The information processing device 1 includes a print job generation unit 19, a printer spooler 21, and a print server 23.

The print job generation unit 19 generates the print job 201. The print job generation unit 19 is implemented by the processing side processor 3 executing the print job generation program 15.

The printer spooler 21 receives the print job 201 transmitted from the print job generation unit 19 and stores the received print job 201 in a spooler area 25 of the processing side storage unit 5. Further, the printer spooler 21 reads the print job 201 from the spooler area 25 of the processing side storage unit 5 and transmits the read print job 201 to the print server 23. The printer spooler 21 is implemented by using a function of the operating system 13 executed by the processing side processor 3.

The print server 23 receives the print job 201 transmitted from the printer spooler 21 and stores the received print job 201 in a server area 27 of the processing side storage unit 5. Note that the print server 23 is one example of an acquisition unit, and the server area 27 is one example of a storage unit. Further, the print server 23 reads the print job 201 from the server area 27 and transmits the read print job 201 to the printer device 101. The print server 23 is implemented by the processing side processor 3 executing the print job transmission program 17. The print server 23 is one example of a transmission unit.

Note that the print job 201 in accordance with a particular protocol such as an Internet printing protocol (IPP) is transmitted to the print server 23 by a driver provided by the operating system 13. The print server 23 includes driver functions corresponding to respective models of the printer device 101 and converts the print job 201 in accordance with a particular protocol into data that can be interpreted by the printer device 101 to transmit the converted data to the printer device 101. Accordingly, even the printer device 101 that does not support a particular protocol can execute the print job 201 received from the information processing device 1.

Figure 5A:
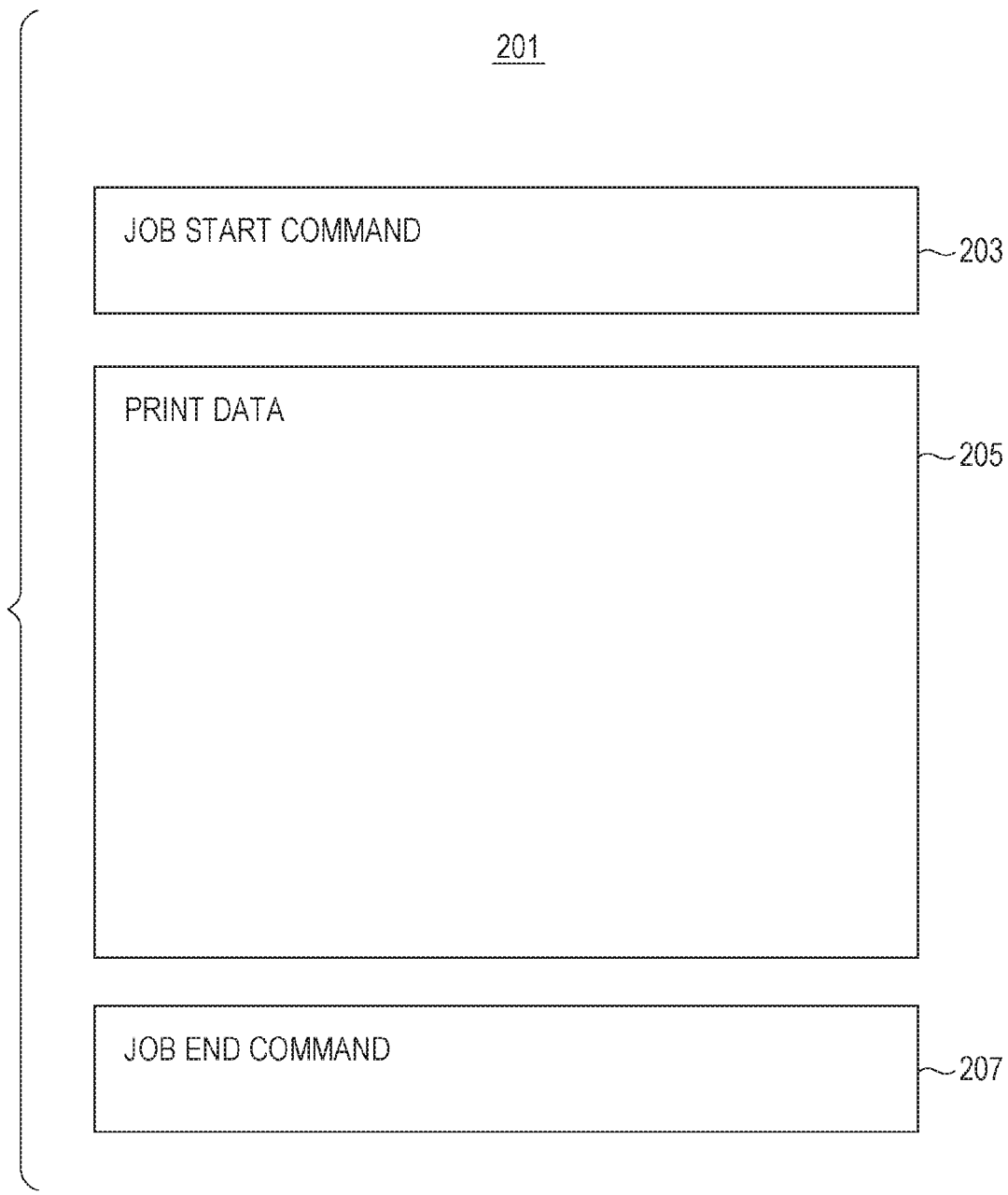
FIG. 5A is a diagram illustrating a configuration of a print job.

With reference to FIG. 5A, the data structure of the print job 201 will be described. The print job 201 includes a job start command 203, print data 205, and a job end command 207. The job start command 203 is a command indicating start of the print job 201 and is structured to cause the printer device 101 to perform a job start process. The print data 205 is inserted between the job start command 203 and the job end command 207 and is structured to cause the printer device 101 to execute a printing process. The job end command 207 is a command indicating the end of the print job 201 and is structured to cause the printer device 101 to perform a job end process.

Although the job start process is a process performed prior to a printing process in the printer device 101, when performing consecutive printing processes, the printer device 101 is not required to perform the job start process between consecutive printing processes. Similarly, although the job end process is a process performed after a printing process in the printer device 101, when performing consecutive printing processes, the printer device 101 is not required to perform the job end process between consecutive printing processes.

Figure 6:
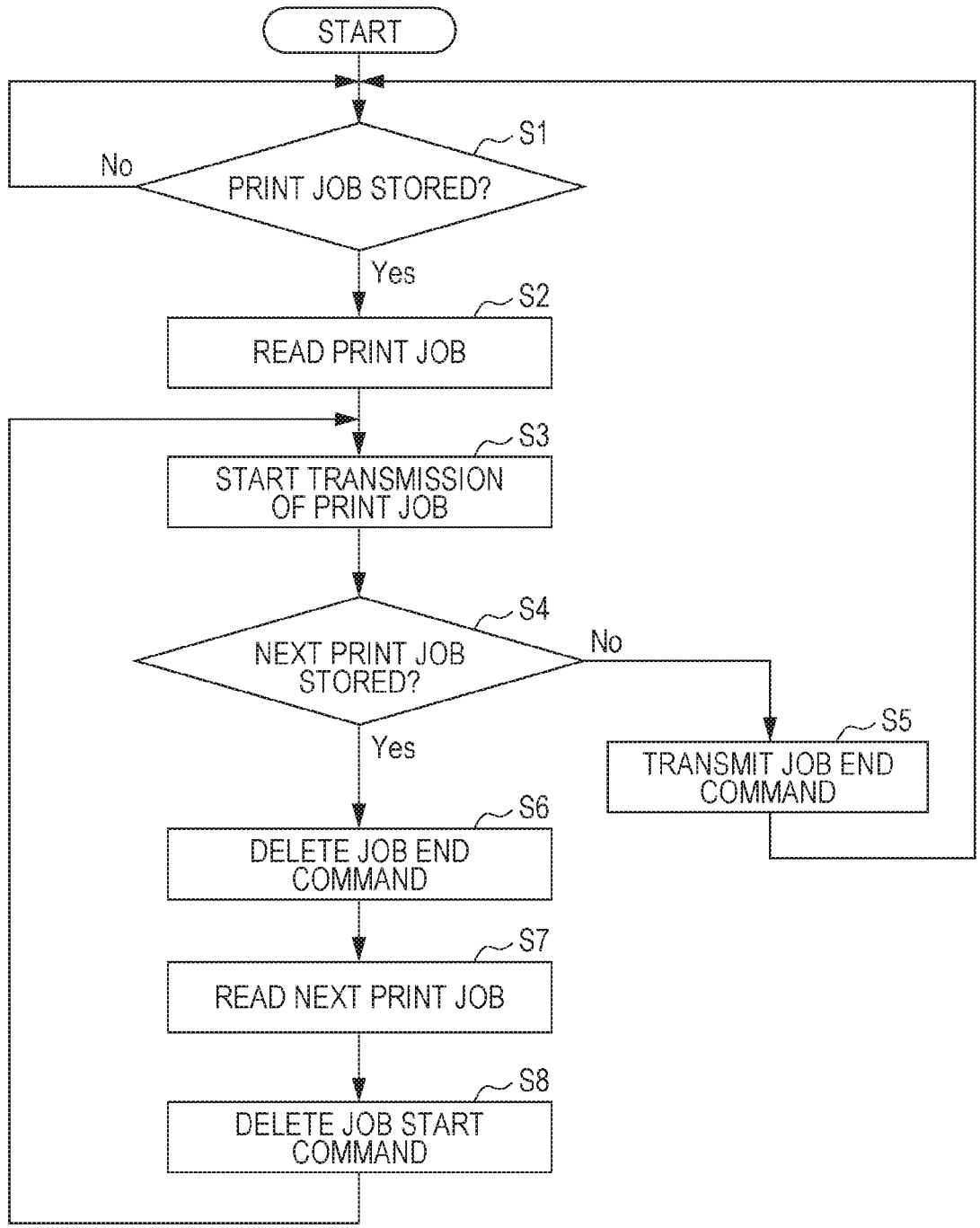
FIG. 6 is a flowchart illustrating a flow of a transmission process of print jobs.

With reference to FIG. 6, a transmission process of the print job 201 performed by the print server 23 will be described. In step S1, the print server 23 determines whether or not the print job 201 is stored in the server area 27 of the processing side storage unit 5. If the print server 23 determines that the print job 201 is stored in the server area 27 (S1, Yes), the process proceeds to step S2. On the other hand, if the print server 23 determines that the print job 201 is not stored in the server area 27 (S1, No), the print server 23 repeatedly performs step S1.

In step S2, the print server 23 reads the print job 201 from the server area 27.

In step S3, the print server 23 starts transmitting the print job 201 to the printer device 101.

In step S4, before transmitting the job end command 207 included in the print job 201 being transmitted, the print server 23 determines whether or not the next print job 201 subsequent to the print job 201 being transmitted is stored in the server area 27. If the print server 23 determines that the next print job 201 is not stored in the server area 27 (S4, No), the process proceeds to step S5.

In step S5, the print server 23 transmits the job end command 207 and returns to step S1.

On the other hand, if the print server 23 determines that the next print job 201 is stored in the server area 27 in step S4 (S4, Yes), the process proceeds to step S6.

In step S6, the print server 23 deletes the job end command 207 included in the print job 201 being transmitted.

In step S7, the print server 23 reads the next print job 201 from the server area 27.

In step S8, the print server 23 deletes the job start command 203 included in the next print job 201 and then returns to step S3 to start transmitting the next print job 201.

As discussed above, when the next print job 201 subsequent to the print job 201 being transmitted is stored in the server area 27, the print server 23 transmits the next print job 201 without transmitting the job end command 207 included in the print job 201 being transmitted and the job start command 203 included in the next print job 201 and thus transmits the next print job 201 as a single job aggregated with the print job 201 being transmitted (see FIG. 5B). That is, the print server 23 transmits the print job 201 being transmitted from which the job end command 207 has been removed and then transmits the next print job 201 from which the job start command 203 has been removed. Thus, the printing process corresponding to the print job 201 being transmitted and the printing process corresponding to the next printing job 201 are performed successively. For example, when three print jobs 201 are aggregated, a job start process, three printing processes, and a job end process are sequentially performed in the printer device 101.

As described above, according to the information processing device 1 of the present embodiment, when the next print job 201 subsequent to the print job 201 being transmitted is stored in the server area 27, the job end process corresponding to the print job 201 being transmitted and the job start process corresponding to the next print job 201 are omitted in the printer device 101. Accordingly, the total required time for the printer device 101 to execute a plurality of print jobs 201 can be reduced by the time corresponding to the job end process and the job start process that have been omitted.

Further, according to the information processing device 1 of the present embodiment, since aggregation of a plurality of print jobs 201 is performed after the start of transmission of the print job 201, transmission of the print job 201 can be started before the plurality of print jobs 201 are stored in the server area 27. Therefore, when the plurality of print jobs 201 are aggregated, delay of the start of a printing process due to the print jobs 201 can be suppressed in the printer device 101.

Further, according to the information processing device 1 of the present embodiment, the user is able to aggregate a plurality of print jobs 201 and transmit the aggregated print jobs 201 via the same operation procedure as that when transmitting a single print job 201. That is, when the next print job 201 is stored in the server area 27 during transmission of the current print job 201, the print job 201 being transmitted and the next print job 201 are aggregated, and therefore the user is not required to select in advance whether or not to use the operating unit 7 to aggregate the plurality of print jobs 201 for transmission. Further, when the next print job 201 is stored in the server area 27 during transmission of the current print job 201, since the next print job 201 is automatically aggregated to the print job 201 being transmitted, the user is not required to use the operating unit 7 and provide an instruction to start printing after a plurality of print jobs 201 are stored in the server area 27.

Second Embodiment

Figure 7:
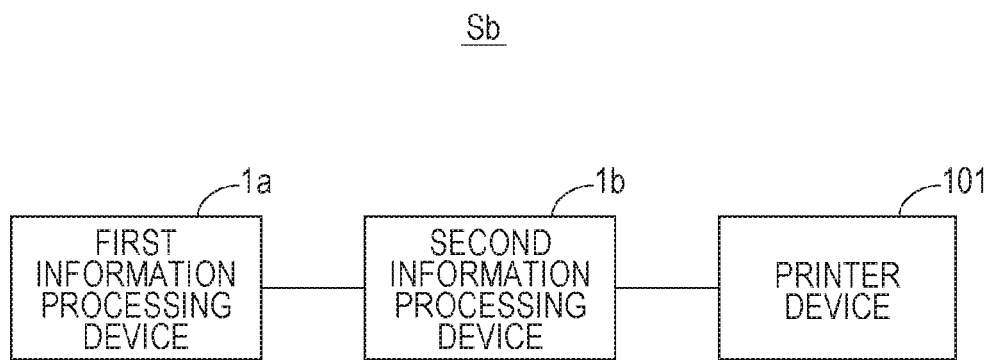
FIG. 7 is a block diagram illustrating a print system of a second embodiment.

With reference to FIG. 7, a printer system Sb of a second embodiment will be described. The printer system Sb of the second embodiment includes a first information processing device 1a, a second information processing device 1b, which is one example of a job transmission device, and the printer device 101. The first information processing device 1a and the second information processing device 1b are connected so as to communicate with each other in a wired or wireless manner, and the second information processing device 1b and the printer device 101 are connected so as to communicate with each other in a wired or wireless manner. Each of the first information processing device 1a and the second information processing device 1b may be, for example, a personal computer, a smartphone, a tablet terminal, or the like as with the information processing device 1 described above. The first information processing device 1a generates the print job 201 and transmits the generated print job 201 to the second information processing device 1b. The second information processing device 1b receives the print job 201 transmitted from the first information processing device 1a and transmits the received print job 201 to the printer device 101. The printer device 101 receives the print job 201 transmitted from the second information processing device 1b and performs a printing process in accordance with the received print job 201.

Figure 8:
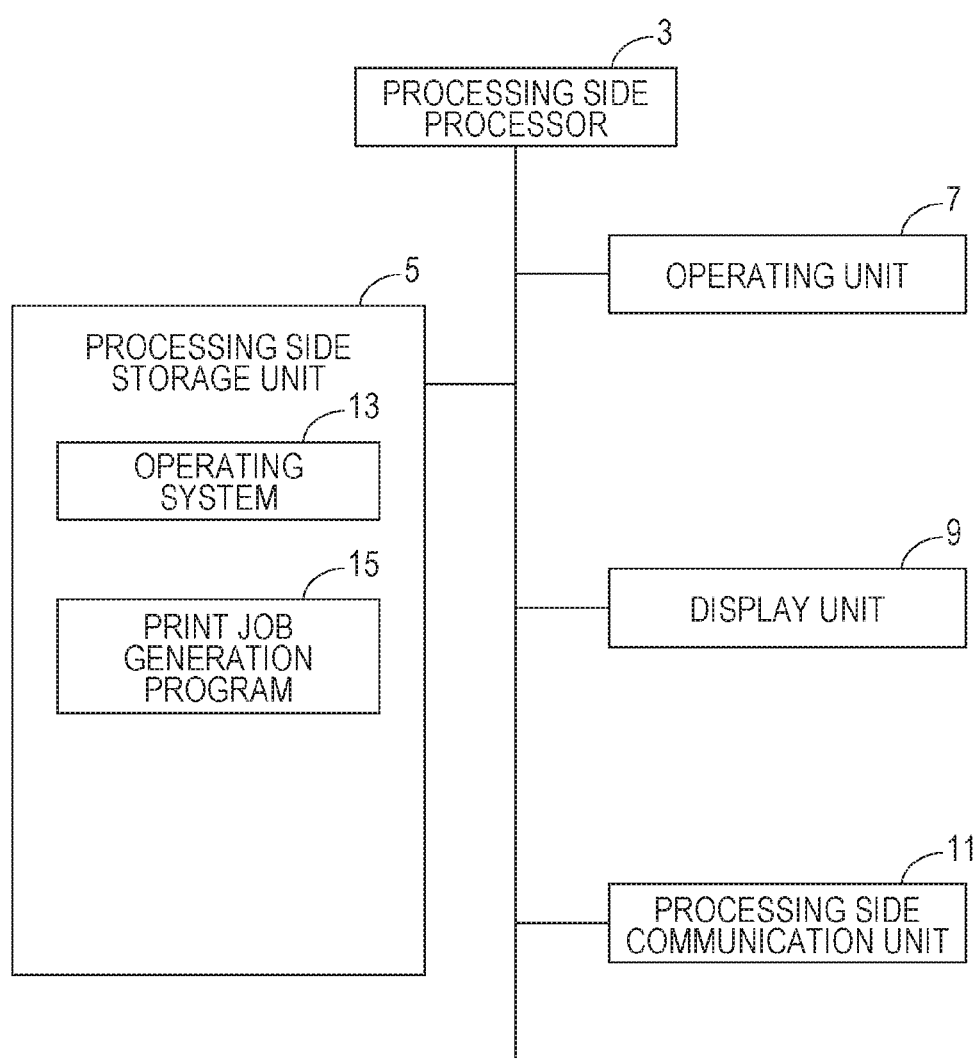
FIG. 8 is a block diagram illustrating a hardware configuration of a first information processing device.

FIG. 8 illustrates the hardware configuration of the first information processing device 1a. The first information processing device 1a is configured in substantially the same manner as the information processing device 1 illustrated in FIG. 2 but differs in that the print job transmission program 17 is not stored in the processing side storage unit 5.

Figure 9:
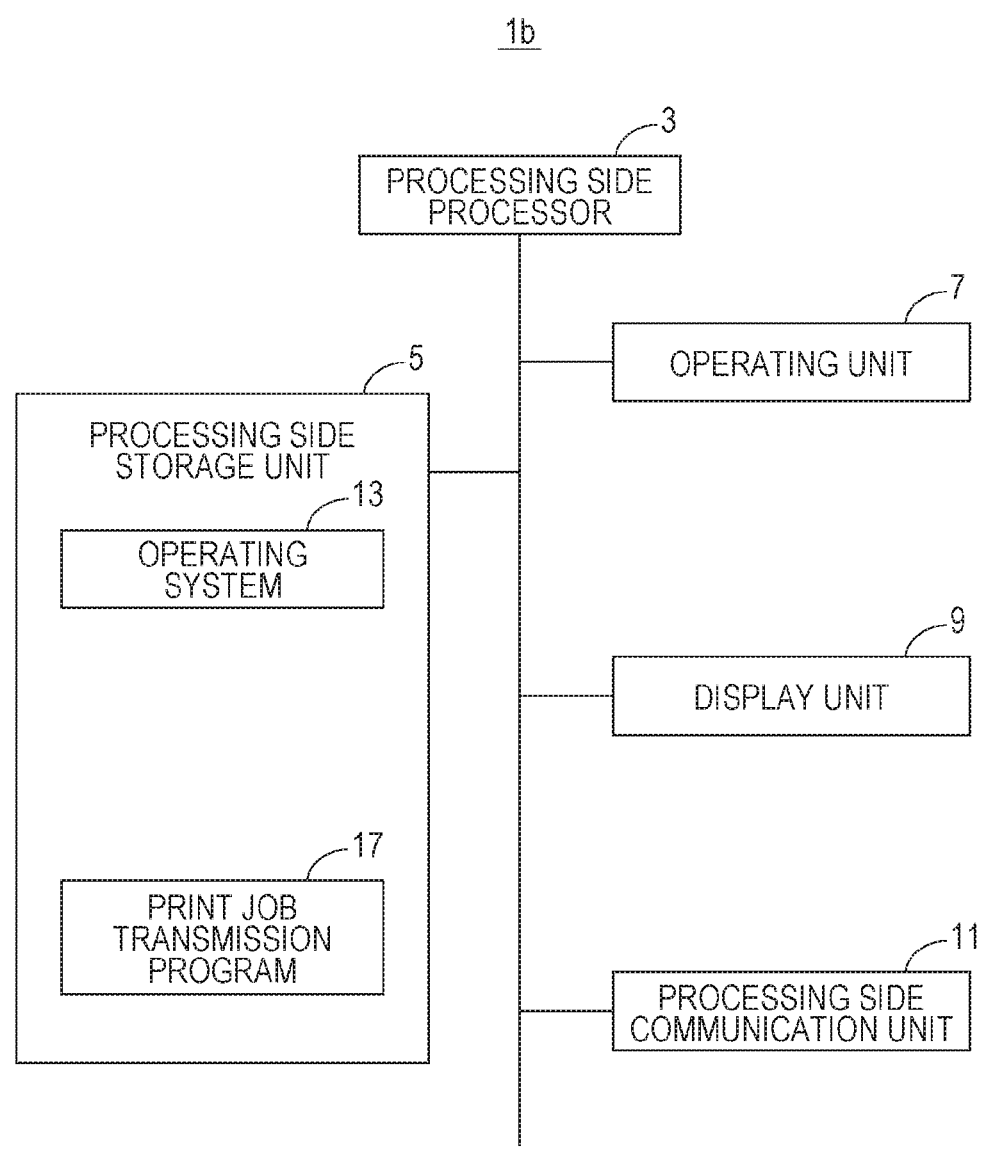
FIG. 9 is a block diagram illustrating a hardware configuration of a second information processing device.

FIG. 9 illustrates the hardware configuration of the second information processing device 1b. The second information processing device 1b is configured in substantially the same manner as the first information processing device 1a illustrated in FIG. 8 but differs in that, instead of the print job generation program 15, the print job transmission program 17 is stored in the processing side storage unit 5. Note that, since the printer device 101 is configured in the same manner as that of the first embodiment, the description thereof will be omitted.

Figure 10:
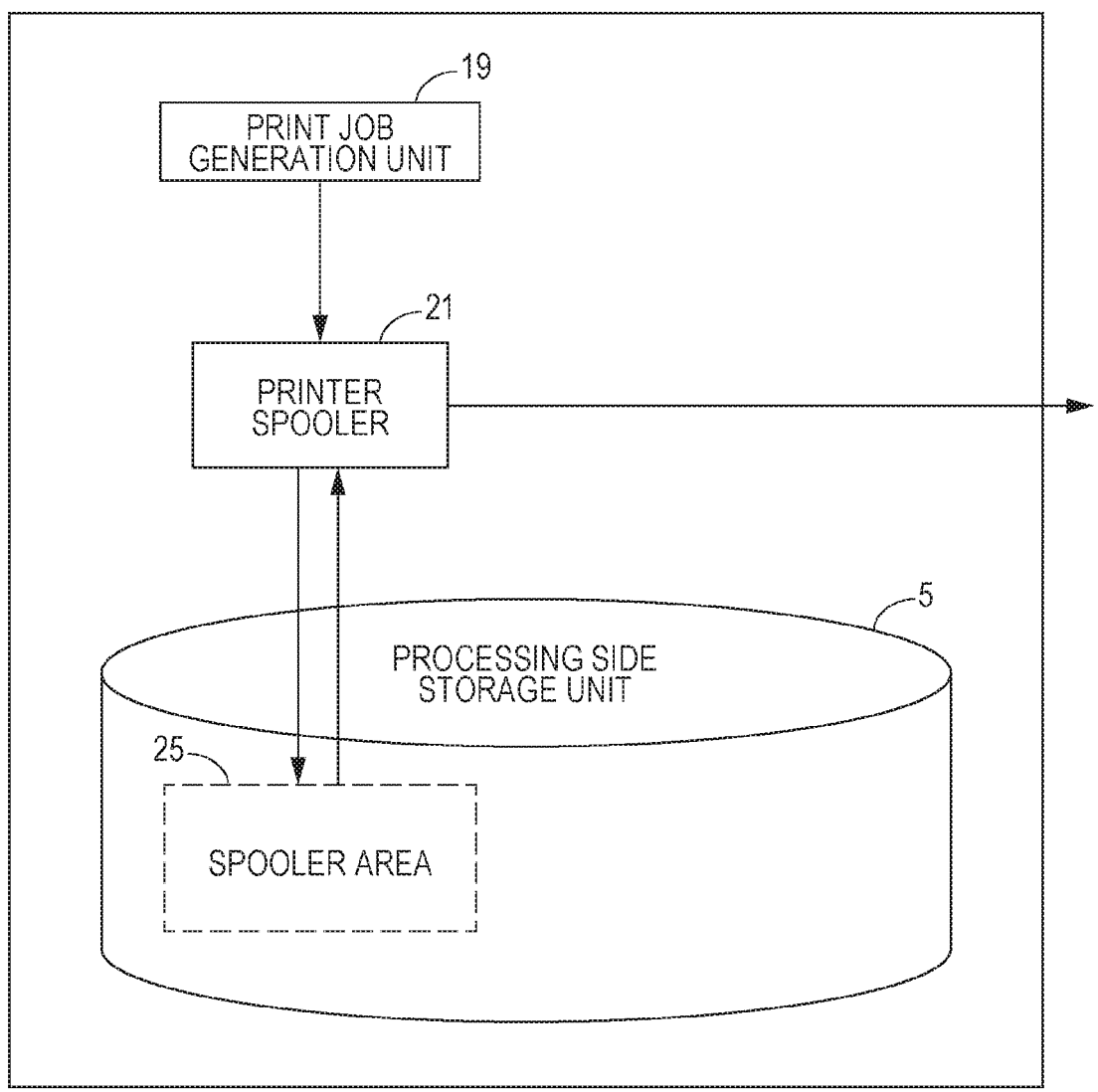
FIG. 10 is a block diagram illustrating a function configuration of the first information processing device.

FIG. 10 illustrates the function configuration of the first information processing device 1a. The first information processing device 1a is configured in the same manner as the information processing device 1 illustrated in FIG. 4 but differs in not including the print server 23. The printer spooler 21 functions in the same manner as the printer spooler 21 of the information processing device 1 illustrated in FIG. 4 except for a function of transmitting the print job 201 read from the processing side storage unit 5 to the second information processing device 1b.

Figure 11:
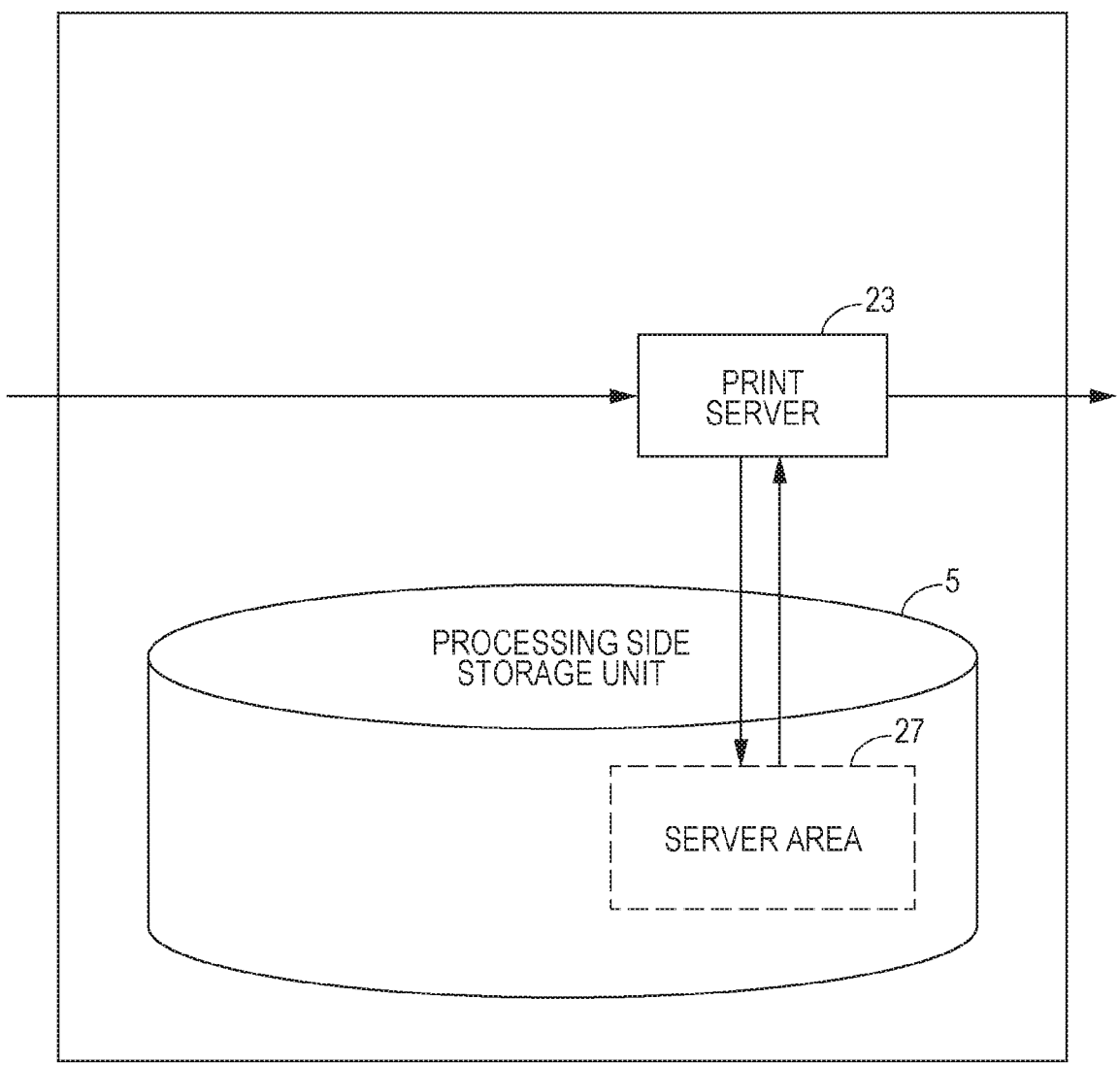
FIG. 11 is a block diagram illustrating a function configuration of the second information processing device.

FIG. 11 illustrates the function configuration of the second information processing device 1b. The second information processing device 1b includes the print server 23. The print server 23 functions in the same manner as the print server 23 of the information processing device 1 illustrated in FIG. 4 except for a function of storing the print job 201 received from the first information processing device 1a in the processing side storage unit 5. That is, the print server 23 similarly performs the transmission process of the print job 201 illustrated in FIG. 6.

As described above, the print server 23 is not limited to be provided in the information processing device 1 that is the same as the information processing device 1 including the printer spooler 21 but may be provided in the second information processing device 1b that is different from the first information processing device 1a including the printer spooler 21.

Third Embodiment

Figure 12:
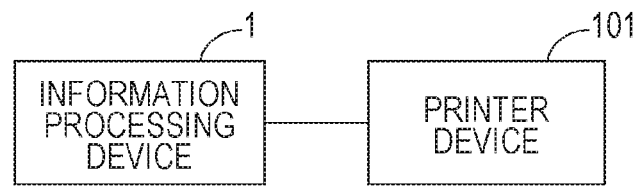
FIG. 12 is a block diagram illustrating a printer system of a third embodiment.

With reference to FIG. 12, a printer system Sc of a third embodiment will be described. The printer system Sc of the third embodiment includes the information processing device 1 and the printer device 101, which is one example of a job processing device. The information processing device 1 generates the print job 201 and the transmits the generated print job 201 to the printer device 101. The printer device 101 receives the print job 201 transmitted from the information processing device 1 and performs a printing process in accordance with the received print job 201.

Figure 13:
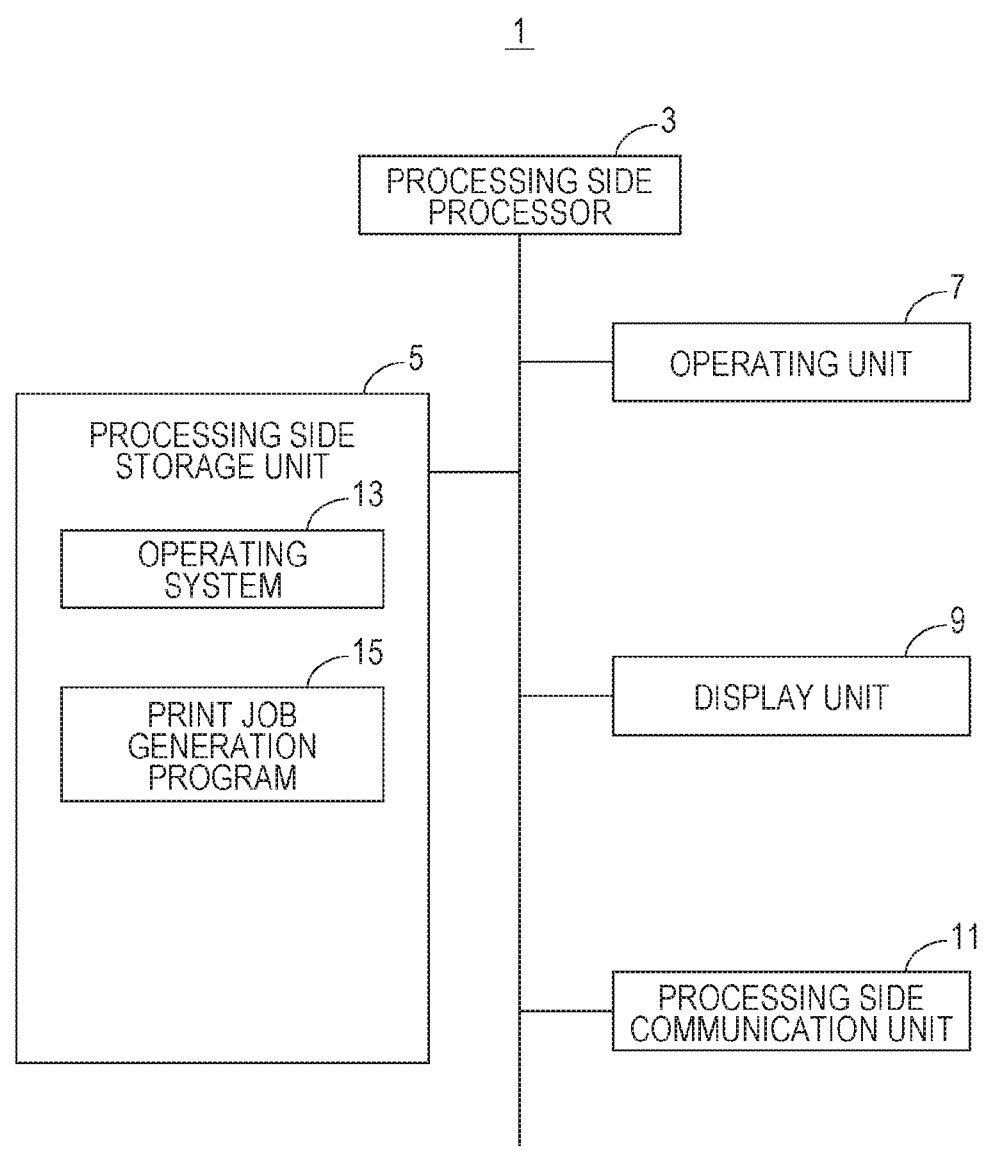
FIG. 13 is a block diagram illustrating a hardware configuration of an information processing device.

FIG. 13 illustrates the hardware configuration of the information processing device 1. The information processing device 1 is configured in substantially the same manner as the information processing device 1 illustrated in FIG. 2 but differs in that the print job transmission program 17 is not stored in the processing side storage unit 5.

Figure 14:
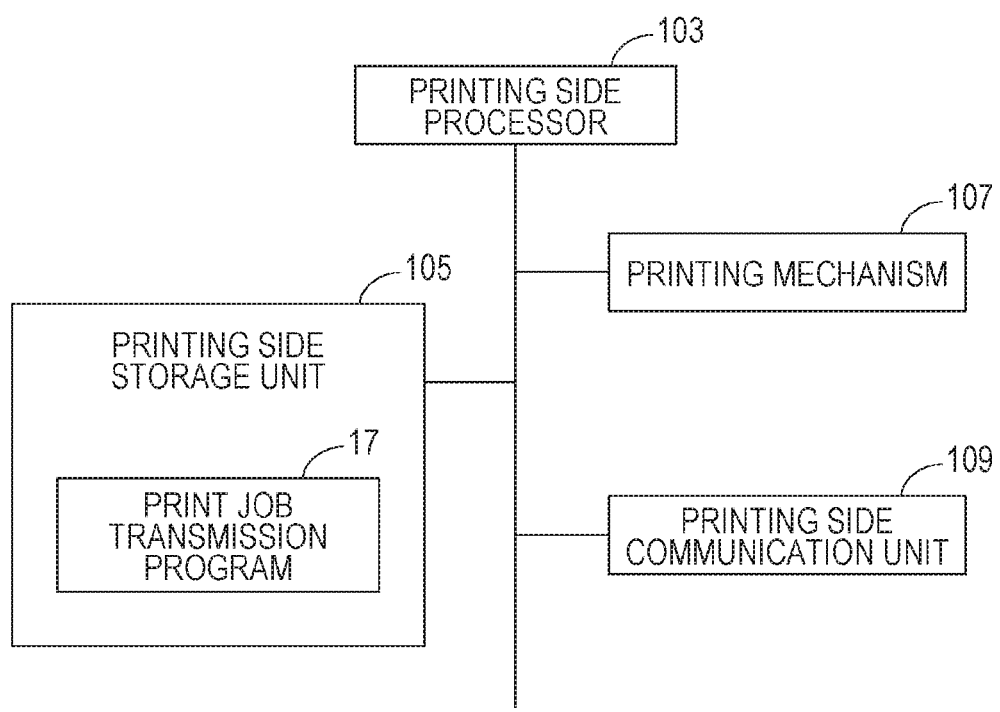
FIG. 14 is a block diagram illustrating a hardware configuration of a printer device.

FIG. 14 illustrates the hardware configuration of the printer device 101. The printer device 101 is configured in substantially the same manner as the printer device 101 illustrated in FIG. 3 but differs in that the print job transmission program 17 is stored in the printing side storage unit 105.

Figure 15:
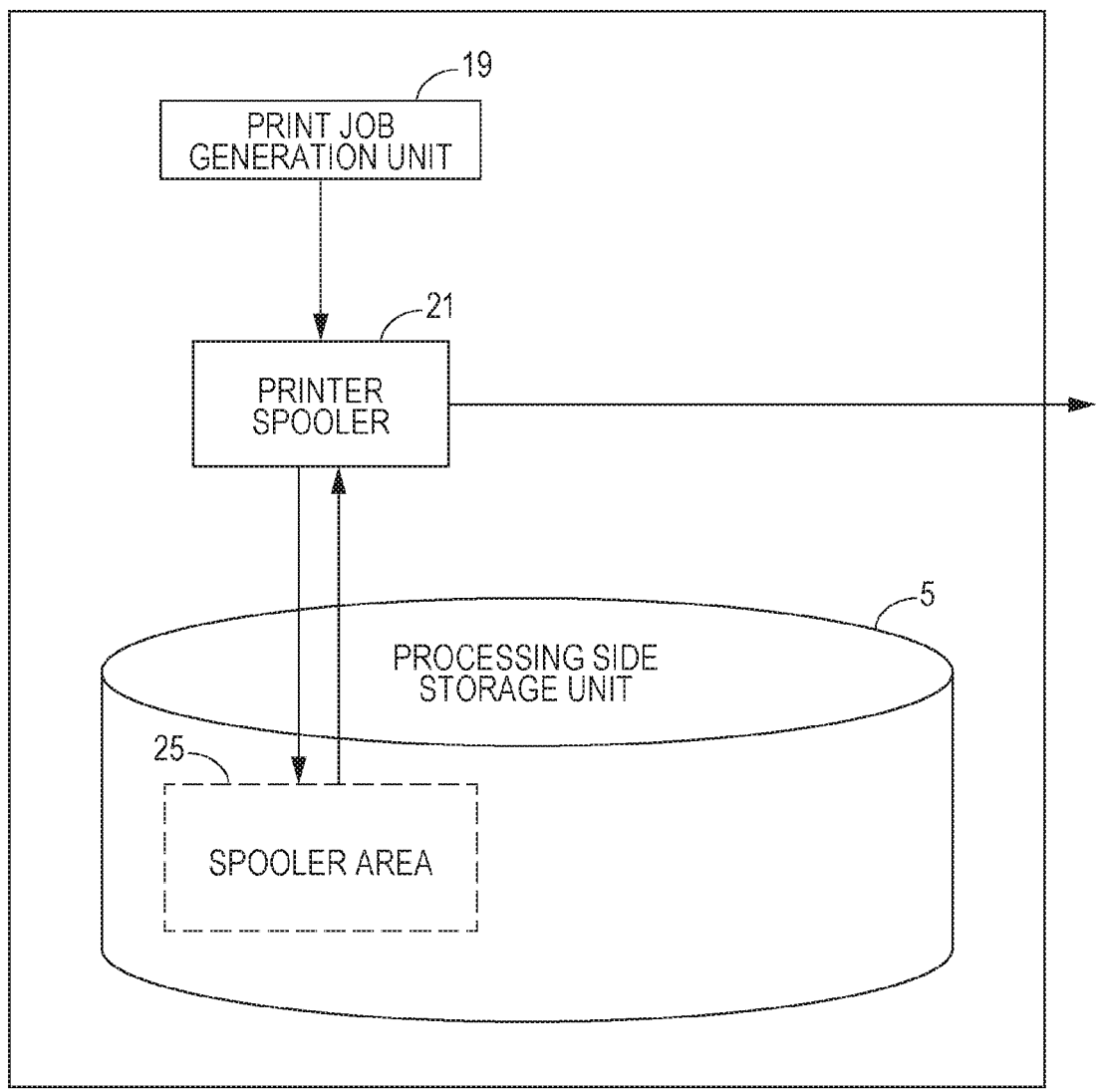
FIG. 15 is a block diagram illustrating a function configuration of an information processing device.

FIG. 15 illustrates the function configuration of the information processing device 1. The information processing device 1 is configured in the same manner as the information processing device 1 illustrated in FIG. 4 but differs in not including the print server 23. The printer spooler 21 functions in the same manner as the printer spooler 21 of the information processing device 1 illustrated in FIG. 4 except for a function of transmitting the print job 201 read from the processing side storage unit 5 to the printer device 101.

Figure 16:
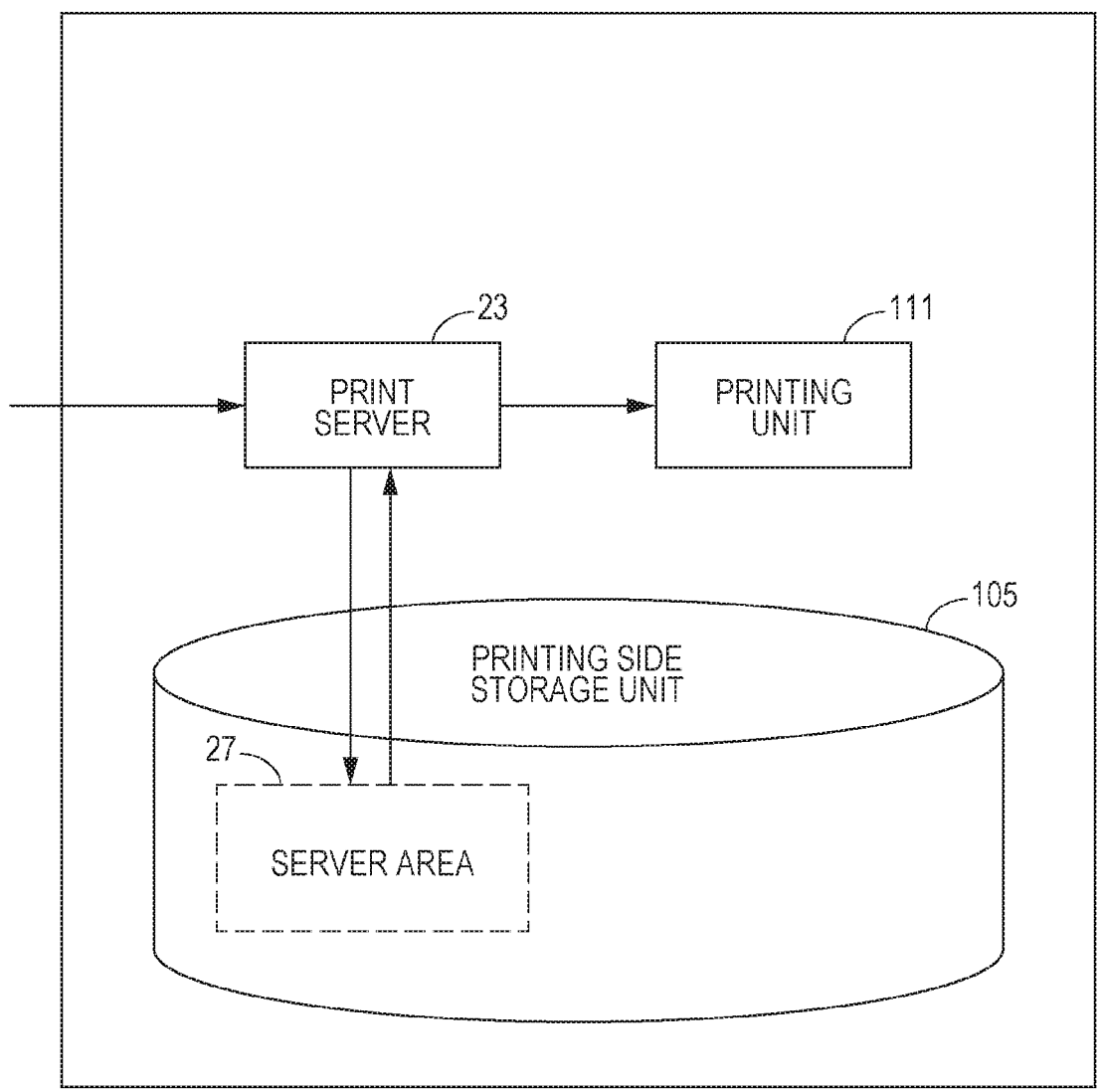
FIG. 16 is a block diagram illustrating a function configuration of a printer device.

FIG. 16 illustrates the function configuration of the printer device 101. The printer device 101 includes the print server 23 and a printing unit 111. The print server 23 functions in the same manner as the print server 23 of the information processing device 1 illustrated in FIG. 4 except for functions of storing the print job 201 received from the information processing device 1 in the printing side storage unit 105 and transmitting the print job 201 read from the printing side storage unit 105 in the printing unit 111. That is, the print server 23 similarly performs a transmission process of the print job 201 illustrated in FIG. 6. The printing unit 111 performs a printing process in accordance with the print job 201 transmitted from the print server 23.

As described above, the print server 23 is not limited to be provided in the information processing device 1 but may be provided in the printer device 101.

Other Modified Examples

Without being limited to the embodiments described above, various configurations may be employed within the scope not departing from the spirit thereof. For example, the embodiments described above may be modified in the following forms in addition to those described above.

When the next print job 201 subsequent to the print job 201 being transmitted is stored in the processing side storage unit 5 or the printing side storage unit 105, the print server 23 is not limited to be configured to aggregate the next print job 201 to the print job 201 being transmitted. For example, the print server 23 may select whether or not to aggregate the next print job 201 to the print job 201 being transmitted in accordance with whether or not the print job 201 being transmitted and the next print job 201 are from the same user. That is, the print server 23 may be configured to aggregate the next print job 201 to the print job 201 being transmitted if the print job 201 being transmitted and the next print job 201 are associated with the same user and not to aggregate the next print job 201 to the print job 201 being transmitted if the print job 201 being transmitted and the next print job 201 are associated with different users. The print server 23 determines whether or not the print job 201 being transmitted and the next print job 201 are associated with the same user in accordance with user information included in the print job 201, for example.

A device to which a job is transmitted is not limited to the printer device 101 but may be, for example, a reading device, a facsimile device, or the like or a multifunction printer having these functions. Similarly, a job to be transmitted is not limited to the print job 201 but may be, for example, a facsimile job used for performing a facsimile transmission process or the like.

The print job transmission program 17 may be stored in a computer readable storage medium (a CD-ROM, flash memory, or the like), and such a computer readable storage medium may be provided. Further, the embodiments described above and a modified example may be combined.

Supplementary Notes

Supplementary notes for a job transmission device, a job processing device, a program, and a job transmission method performed by a job transmission device will be provided below.

A job transmission device includes: a storage unit that stores a job; and a transmission unit that transmits the job, and when the next job subsequent to the job being transmitted is stored in the storage unit, the transmission unit aggregates the next job to the job being transmitted and transmits the next job as a single job aggregated to the job being transmitted.

According to such a configuration, since aggregation of a plurality of jobs is performed after job transmission is started, the job transmission may be started before the plurality of jobs are stored in the storage unit. Therefore, even when a plurality of jobs are aggregated, delay of the start of a process based on a job may be suppressed at a job destination entity.

In such a case, before transmitting a job end command included in the job being transmitted, the transmission unit may determine whether or not the next job is stored in the storage unit.

According to such a configuration, it is possible to determine during job transmission whether or not the next job is stored in the storage unit.

In such a case, when the next job is stored in the storage unit, the transmission unit may transmit the next job as the single job, which is aggregated to the job being transmitted, by transmitting neither a job end command included in the job being transmitted nor a job start command included in the next job and by transmitting the job being transmitted from which the job end command is removed and then transmitting the next job from which the job start command is removed.

According to such a configuration, at the job destination entity, a job end process corresponding to a job being transmitted and a job start process corresponding to the next job are omitted. Accordingly, the total required time for the job destination entity to execute a plurality of print jobs can be reduced by the time corresponding to the omission of the job end process and the job start process.

In such a case, when the next job is stored in the storage unit, the transmission unit may aggregate the next job to the job being transmitted if the job being transmitted and the next job are associated with the same user and not aggregate the next job to the job being transmitted if the job being transmitted and the next job are associated with different users.

According to such a configuration, it is possible to suppress aggregation of jobs associated with different users.

In such a case, an acquisition unit that acquires the job from a spooler may be provided, and the storage unit may store the job acquired from the spooler.

According to such a configuration, a job acquired from the spooler may be stored in the storage unit.

In such a case, the job may be a print job used for performing a printing process.

According to such a configuration, delay of the start of printing due to aggregation of a plurality of print jobs may be suppressed.

A job processing device includes: a storage unit that stores a job; a transmission unit that transmits the job; and a processing unit that receives the job transmitted from the transmission unit and processes the received job, and when the next job subsequent to the job being transmitted is stored in the storage unit, the transmission unit aggregates the next job to the job being transmitted and transmits the next job as a single job aggregated to the job being transmitted.

According to such a configuration, since aggregation of a plurality of jobs is performed after job transmission is started, the job transmission may be started before the plurality of jobs are stored in the storage unit. Therefore, even when a plurality of jobs are aggregated, delay of the start of a process based on a job may be suppressed at the job destination entity.

A program causes a processor to aggregate the next job to a job being transmitted and transmits the next job as a single job aggregated to the job being transmitted when the next job subsequent to the job being transmitted is stored in a storage unit.

According to such a configuration, since aggregation of a plurality of jobs is performed after job transmission is started, the job transmission may be started before the plurality of jobs are stored in the storage unit. Therefore, even when a plurality of jobs are aggregated, delay of the start of a process based on a job may be suppressed at the job destination entity.

A job transmission method performed by a job transmission device includes aggregating the next job to a job being transmitted and transmitting the next job as a single job aggregated to the job being transmitted when the next job subsequent to the job being transmitted is stored in a storage unit.

According to such a configuration, since aggregation of a plurality of jobs is performed after job transmission is started, the job transmission may be started before the plurality of jobs are stored in the storage unit. Therefore, even when a plurality of jobs are aggregated, delay of the start of a process based on a job may be suppressed at the job destination entity.

What is claimed is:

1. A job transmission device comprising:
   a storage unit that stores one or more jobs, each of which includes a job start command, job data, and a job end command; and
   a transmission unit that transmits the one or more jobs, wherein
   the transmission unit is configured to:
      transmit the job start command and job data of a first job among the one or more jobs,
      determines whether a second job that is subsequent to the first job is stored in the storage unit after transmitting the job data of the first job and before transmitting the job end command of the first job,
      in response to determining that the second job is stored in the storage unit,
         delete the job end command of the first job,
         delete the job start command of the second job, and
         transmit the job data of the second job, and
      in response to determining that no second job is stored in the storage unit, transmit the job end command of the first job.

2. The job transmission device according to claim 1, wherein:
   when the second job is stored in the storage unit, the transmission unit further determines whether the first job and the second job are both associated with a same user,
   the appending of the second job to the first job is performed when the first job and the second job are both associated with the same user, and
   the appending of the second job is not performed when the first job and the second job are associated with different users.

3. The job transmission device according to claim 1 further comprising an acquisition unit that acquires each job from a spooler, wherein the storage unit stores each job acquired from the spooler.

4. The job transmission device according to claim 1, wherein each job is a print job used for performing a printing process.

5. A non-transitory computer-readable medium stored thereon a program that causes a processor to perform the following:
   receive one or more jobs, each of the one or more jobs including a job start command, job data, and a job end command;
   transmit the job start command and job data of a first job among the one or more jobs;
   determine whether a second job that is subsequent to the first job is stored in a storage unit after transmitting the job data of the first job and before transmitting the job end command of the first job;
   in response to determining that the second job is stored in the storage unit,
      delete the job end command of the first job,
      delete the job start command of the second job, and
      transmit the job data of the second job, and
   in response to determining that no second job is stored in the storage unit, transmit the job end command of the first job.

6. A job transmission method performed by a job transmission device, the job transmission method comprising:
   receiving one or more jobs, each of the one or more jobs including a job start command, job data, and a job end command;

transmitting the job start command and job data of a first job among the one or more jobs;
determining whether a second job that is subsequent to the first job is stored in a storage unit after transmitting the job data of the first job and before transmitting the job end command of the first job;
in response to determining that the second job is stored in the storage unit,
 deleting the job end command of the first job,
 deleting the job start command of the second job, and transmitting the job data of the second job, and
in response to determining that no second job is stored in the storage unit, transmitting the job end command of the first job.

* * * * *